Jan. 7, 1941.  A. J. SCHOLTES  2,228,018
PROGRESSIVELY EXPANDED NIPPLE HOSE COUPLING
Filed Aug. 24, 1939
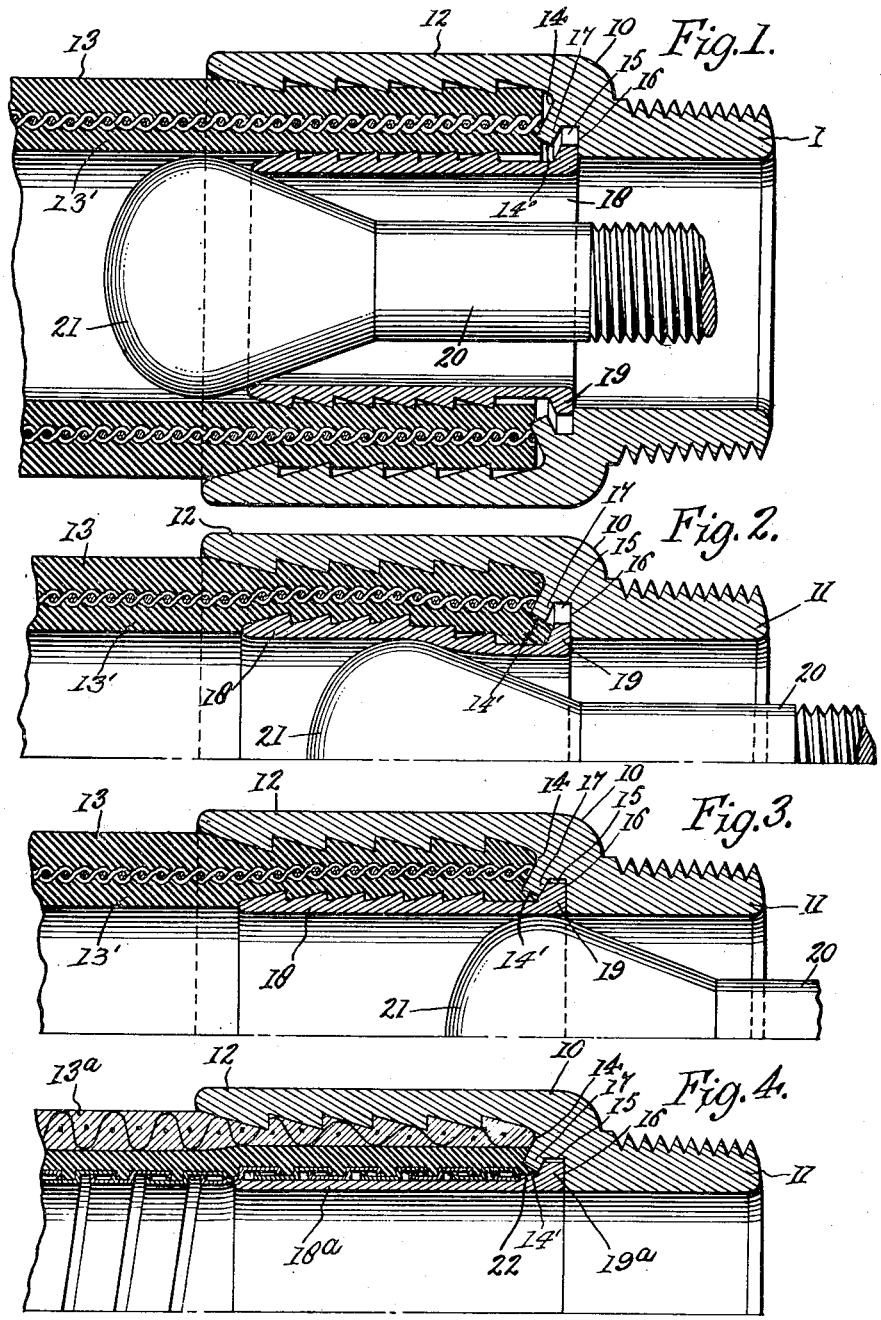
Inventor
Albert J. Scholtes
By Mawhinney & Mawhinney
Attorneys Patented Jan. 7, 1941

2,228,018

UNITED STATES PATENT OFFICE 2,228,018

PROGRESSIVELY EXPANDED NIPPLE HOSE COUPLING

Albert J. Scholtes, Baltimore, Md.

Application August 24, 1939, Serial No. 291,786

4 Claims. (Cl. 285—84)

This invention relates to hose couplings having internally expanded nipples, and more particularly to that type wherein the nipple is expanded by the axially progressive pressure of an expander tool working from the inside of the hose outwardly through the nipple and the body of the coupling.

It is known by experience that with the use of hose which is constructed to deliver gasoline and oils, such hose must be provided either with a metal armor inside tube or a neoprene synthetic inner tube, to resist the action of gasoline or oil, which breaks down and dissolves the ordinary rubber lining of the hose. All couplings used at present on such hose, the coupling must be constructed so as to prevent a seepage of gasoline or oil backward between the outer end of the nipple and the coupling body which seepage would come into contact with the carcass of the hose and soon destroy it. At the present time couplings used for this type of hose are either sealed by soldering the outer end of the nipple to the coupling body or placing of a neoprene washer around the nipple within the coupling at a point where the latter would seal such back seepage. In all such couplings it has also been desirous to have some manner of lock for the nipple so as to lock the nipple to the coupling body so as to prevent it from slipping back inward under the pressure caused by the compressing of the hose end within the couplings, such slipping back would reduce the sealing effect of the expanded nipple, and the lock further serves so that both the nipple and coupling body act to resist axial stresses.

Such structures as are shown in the Wallace Patent No. 1,915,041, granted June 20, 1933, are known, and particularly the construction shown in Figure 3 of this patent. Here the abutment shoulder is of the full width of the end wall of the hose and restrains all portions of the hose end against axial movement so that no portion of the hose can be compressed into position for engagement between the inner end of the shoulder and the nipple when the latter is expanded. Also, there is no provision in Wallace for holding the nipple against axial movement during expansion. Among various other known patented structure is the coupling shown in the patent to Nelson and Brown No. 863,745 granted August 20, 1907. In this latter patent the inner liner portion of the hose is used for effecting the seal, but the seal is maintained only by the inherent pressure of the fluid in the hose while in use.

An object of this invention is to provide a coupling having a progressively expanded nipple which while being expanded forces a portion of the inner liner, rubber or synthetic rubber, of the hose into a pocket between the coupling body and the outer end of the nipple, which portion of inner liner is further sealed and compressed during the final expansion of the nipple within the hose of the coupling to provide a positive seal without the use of extra means of sealing, such as soldering of the nipple or the use of special rubber or synthetic rubber washers between the nipple and the sleeve of the coupling body.

Buttress type threads may be used within the sleeve of the coupling. These threads may be of either right or left hand, but the left hand threads are preferred, as the spiral wire, or spiral metal lining according to the construction of the different types of hose, are wound right hand, so such left hand thread would tend to reduce the outside diameter of the hose while being screwed into the sleeve of the coupling, making it possible to more easily insert the hose into the coupling, preparatory to expansion. Right hand threads would have the opposite effect on the diameter of the hose hindering very much the insertion of the hose into the sleeve of the coupling.

Another object of this invention is to provide a nipple of the progressively expanded type with an annular exterior flange of metal in the form of a bead at its outer end, which flange of metal when progressively expanded expands into a groove at the inner edge of the coupling body neck adjacent the outer end of the hose in the coupling body. This groove of the coupling body having flowed full of a portion of the inner tube or lining of the hose before the expander has reached the point where the bead or flange of the nipple is expanded into the groove of the sleeve the tube lining having flowed into the groove of the coupling body, in this way forming both a metal lock as well as a neoprene seal for the coupling without the use of solder or a separate neoprene washer.

A further object of this invention is to provide a coupling body and a nipple wherein the nipple extends only a very short distance within the neck of the coupling body, so as to provide a full flow opening in the neck of the coupling body and such neck need not be weakened opposite its outer threads, for the support of the longer old type nipples which extended outward to the end of the neck of the coupling body.

A still further object of this invention is to provide a coupling and nipple so constructed so there is no revolving friction between the inner part of the hose and the outer surface of the nipple but revolves with the hose and advances axially as the hose is being turned into the sleeve of the coupling before expansion is to take place. Such inner friction of the hose and nipple tends to injure or rupture the inner tube of the hose when neoprene or rubber lining is used.

A further object of the invention is to provide a coupling body with a separate nipple; to provide in the construction of body and nipple a snap lock for holding the nipple in the coupling body after the nipple has been inserted in place in the coupling body to hold the coupling assembled during handling and shipment.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a longitudinal section taken through a hose coupling embodying the features of this invention; a hose end being shown inserted in the coupling and the expander tool shown in place ready to secure the coupling on the hose before expansion has taken place.

Figure 2 is a similar view, but showing the expander tool drawn partly through the coupling and with the nipple and hose partly expanded, a portion of the inner lining of the hose being forced into position to be compressed upon the final expansion of the nipple.

Figure 3 is a like view with the expander tool completing the expanding operation and ready to be removed from the coupling and wherein the nipple has been locked and the inner liner has been sealed from the coupling, and Figure 4 is a like view of a slightly modified form of nipple better adapted to different types of hose, such as the spiral inner metal lined hose.

Referring now to the drawing the hose coupling comprises a body portion 10 which at its outer end is provided with a spud 11 of the usual construction having exterior pipe threads and which has an interior bore providing substantially the mean bore or diameter of the coupling body. The coupling body 10 is provided at its inner end with an enlarged sleeve 12 provided with internal threads of the buttress or other suitable type adapted to engage in the exterior surface of the hose 13. The sleeve 12 is provided at its forward end with a shoulder 14 which may be inclined inwardly with respect to the axis and the radius of the coupling so that the inner end of the shoulder 14 presents a marginal edge adapted to embed itself within the extremity of the hose 13 as the latter is forced into the sleeve 12.

The shoulder 14 is not only inclined inwardly but is proportioned in width less than the wall thickness of the hose 13 so that the inner layer 13' or tube of the hose 13 may, under axial and radial pressure, be forced outwardly beneath the shoulder 14 and about the inner edge 14' thereof, and will effectively seal the inner liner of the hose against the inner edge 14' of the shoulder 14 and also provide for the electrical contact against the shoulder 14 with the wires or other structure of the hose for electrical contact where hose of such type is employed and static electrical grounding is required.

The body portion 10 of the coupling is provided with an annular groove or recess 15 which is disposed forwardly of the shoulder 14. The shoulder 14, being short, provides a passage-way about the inner edge 14' of the shoulder between the slot 15 and the interior of the sleeve 12 so that the axially compressed inner layer portion of the hose 13' may be distorted and expanded against the inner edge 14' of the shoulder 14 and toward the slot 15 sufficiently to provide a sealing layer thereabout. The groove 15 is provided with a forward wall of flat radial contour, as shown at 16, while the opposite or rear wall of the slot 15 is inclined inwardly and may have the same general inclination as the shoulder 14, although not necessarily so.

Positioned within the body portion 10 is an expansible nipple 18. The nipple 18 is initially of less internal diameter than that of the spud 11 and is adapted to fit into the bore of the hose 13. The nipple 18 is provided with exterior threads or ribs of any suitable configuration adaptable to the particular type of hose 13 employed. The outer end of the nipple 18 is provided with an outturned flange 19 which has its outer and inner side walls respectively disposed in a flat and a conical plane corresponding to the opposed walls 16 and 17 of the groove 15. The straight wall 16 is provided for the purpose of permitting the free radial expansion of the nipple 18. The inclined wall 17 of the slot 15 provides a suitable locking surface for the flange 19 when the flange 19 is expanded into the slot 15.

A hose coupling is thus provided which may take advantage of the axially progressive expansion movement of an expander, such as shown in the Patent No. 2,146,756 granted February 14, 1939, to W. H. Miller, in securing the coupling on the end of the hose 13. As shown in Figure 1, one type of expander tool 20 is first inserted in the hose 13 with the head 21 of the tool innermost. The coupling is now inserted on the end of the hose 13 and advanced over the hose until the latter engages the shoulder 14, as shown in Figure 1. During this operation the nipple 18 is also introduced into the bore of the hose and the nipple and the body portion are maintained in their relative positions by the flange 19 of the nipple bearing against the flat wall 16 of the groove and also by virtue of the fact that the inner edge 14' of the shoulder 14 and the outer edge of the flange 19 are proportioned as to their diameters so as to frictionally snap by one another to yieldingly hold the nipple in assembled relation in the coupling for shipment and handling.

During operation of expansion, as shown in Figure 2, the head 21 of the expansion tool is drawn axially outward through the end of the hose 13 and through the coupling, expanding the nipple 18 with an axially progressive movement which compresses the hose 13 and forces the latter forwardly into engagement with the shoulder 14 and which also compresses and deforms the inner layer 13' or inner tube portion of the hose about the inner edge 14' of the shoulder, and may force a portion thereof into the groove 15.

Further movement of the expander head 21, as shown in Figure 3, completes the expansion of the nipple and forces the flange 19 thereof into the groove 15 so as to lock the nipple 18 to the body portion 10, and further compress and seal the inner layer 13' of the hose material which has been compressed between the outer surface of the nipple 18 and the inner edge 14' of the shoulder 14 and is held impinged between the contacting surfaces of the nipple 18 and the inner edge 14' of the shoulder 14 to effect a tight or resistant seal between the outer end of the nipple 18 and the body portion 10.

It will be noted that the final stage of expansion causes the locking of the nipple 18 and the compression of the hose 13 against the shoulder 14, so that the inner lining 13' of the hose is held firmly under compression, and the interlocking of the flange 19 in the groove 15 prevents the rebounding of the nipple under such compression and maintains a compressed seal against the inner edge 14' of the shoulder.

In the slight modification shown in Figure 4, the structure is practically the same, the only modification being sufficient to adapt the nipple 18ª to the inner lining structure of the hose 13ª. In the present instance the hose 13ª is provided with the usual metal lining or reinforcement and the nipple 18ª is provided with a smooth exterior surface adapted to bear against the inner surface of the metal liner and expand it in the same manner as is shown in Figures 1, 2 and 3.

In Figure 4 the nipple 18ª is shown as provided with the flange 19ª and the latter has a stepped or shouldered portion 22 which lies within the shoulder 14 on the coupling body and which projects from the outer surface of the nipple 18ª. This stepped or shouldered portion 22 is adapted to receive thereagainst the free metallic liner so as to hold the latter from axial advancement during expansion of the nipple so that the immediate outer layer covering the metallic liner may be deformed and expanded about the edge 14' of the shoulder 14 and toward the groove 15 to effect the seal shown and described in the preferred form.

From the above description it will be seen that the body of the coupling is composed of three portions; an inner end portion, an intermediate portion, and an outer end portion. The outer end portion having the smallest bore and the inner end portion having the largest bore, said bores being stepped and providing abutment shoulders in the inner and intermediate portions, the shoulder 14 of the inner portion limiting the outward movement of a portion of the end wall of the hose 13, and the intermediate bore with its shoulder 16 providing an abutment to prevent the outward movement of the nipple and an annular clearance to receive the remaining unsupported portion of the end wall of the hose 13 under axial pressure.

While the type of expander tool shown in the drawing is of the axially progressive type, which is preferable as it imparts both a definite radial and an axial expansion of the hose, it is to be understood that the radial type of expander can be used because it not only has a definite radially expansive movement but because it compresses the hose and incidentally imparts an axial compressive movement to the hose which effects the seal desired although not as effective as the type of expander shown.

It is obvious that various changes and modifications may be made in the details of construction and design of the above specifically described embodiment of this invention without departing from the spirit thereof, such changes and modifications being restricted only by the scope of the following claims:

What is claimed is:

1. A progressively expanded nipple hose coupling, comprising a coupling body adapted to receive the end of a hose therein and having a stepped shoulder to engage the extremity of the hose and having inner and outer portions disposed in spaced transverse planes and each being of less width than the thickness of the hose wall, and a nipple disposed in the body portion for engagement in the bore of the hose, a flange on said nipple engaging the inner of said shoulder planes, said coupling body and said nipple being so constructed and arranged that the nipple may be expanded progressively from its inner to its outer end for compressing and deforming the end of the hose against said outer plane portion of the shoulder and about the inner edge thereof beyond the plane of the outer portion of the shoulder to impinge the inner layer portion of the hose between the inner edge of the shoulder and the nipple, said coupling body and flange of said nipple serving to lock said body and nipple against relative movement.

2. In a hose coupling, a coupling body having an inwardly abutting shoulder adapted to engage the extremity of a hose inserted in the coupling body, said shoulder having an outer portion of less width than the wall thickness of the hose and having an inner portion disposed in a plane spaced from the plane of the outer portion to provide an annular clearance beyond the inner edge of the outer portion of the shoulder, and an expansible nipple disposed in the body portion, a flange on said nipple engaging the inner portion of said shoulder, said coupling body and said nipple being so constructed and arranged that the nipple may be expanded progressively from its inner to its outer end for compressing and deforming the end of the hose against said outer portion of the shoulder and into said clearance opening about the inner edge of the shoulder to impinge the inner layer portion of the hose between the shoulder and the nipple, said coupling body and flange of said nipple serving to lock said body and nipple against relative movement.

3. In a hose coupling, a coupling body having a hose end receiving shoulder therein of stepped construction with outer and inner portions of less width than the thickness of the wall of the hose and disposed in axially spaced apart transverse planes to provide an abutment for the outer wall portion of the hose and a clearance opening about the inner edge of the outer stepped portion of the shoulder, and an expansible nipple in the coupling body, a flange on said nipple engaging the inner portion of said shoulder, said coupling body and said nipple being so constructed and arranged that the nipple may be expanded to deform and axially compress the inner layer portion of a hose and force the end of said inner layer into said clearance opening and compress the said inner layer of the hose and seal and lock the nipple in the coupling body against relative movement.

4. In a hose coupling, a body portion provided at its inner end with a sleeve adapted to receive the end of a hose, said sleeve having a stepped shoulder for engaging the outer portion of the end wall of the hose and to provide a clearance about the inner edge of the outer portion of the shoulder, said body portion provided with an annular groove in the offset between said shoulder stepped portions, and an expansible nipple disposed in the body portion for insertion in the bore of the hose and provided with an end flange adapted to bear against the inner portion of the shoulder and provided adjacent said flange with a stop shoulder to engage and hold back the end of the metallic inner lining of a reinforced hose, said body portion and nipple being so constructed and arranged that the nipple may be expanded progressively from its inner to its outer end for axially compressing and deforming the hose end toward and against said stepped shoulder and to compress and deform the inner layer portion of the hose wall into said clearance opening and groove in the offset between the stepped portions of the shoulder, said coupling body and flange of said nipple serving to lock said body and nipple against relative movement.

ALBERT J. SCHOLTES.